UNITED STATES PATENT OFFICE.

ARTHUR LÜTTRINGHAUS AND HEINRICH VON DIESBACH, OF MANNHEIM, GERMANY, ASSIGNORS TO BADISCHE ANILIN & SODA FABRIK, OF LUDWIGSHAFEN-ON-THE-RHINE, GERMANY, A CORPORATION OF GERMANY.

ORANGE-YELLOW VAT DYE.

1,044,673.  Specification of Letters Patent.  Patented Nov. 19, 1912.

No Drawing.  Application filed November 3, 1911. Serial No. 658,387.

*To all whom it may concern:*

Be it known that we, ARTHUR LÜTTRINGHAUS and HEINRICH VON DIESBACH, the first a subject of the King of Prussia and the second a citizen of the Swiss Republic, residing at Mannheim, Germany, have invented new and useful Improvements in Orange-Yellow Vat Dye, of which the following is a specification.

Our invention relates to a new coloring matter which we regard as a halogenated anthraquinone-thioxanthone of a constitution, assuming the chlorinated compound to be shown, corresponding to the formula

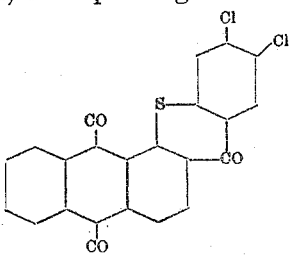

We can prepare our new coloring matter by first treating 1-chloranthraquinone-2-carboxylic acid with 3.4-dichlor-thiophenol and then treating the product with a condensing agent such, for instance, as concentrated sulfuric acid, until a thioxanthone ring is formed.

Our new coloring matter consists, when dry, of an orange-yellow powder and, in the pure state, has a percentage composition corresponding to the above formula. It yields a carmine red solution in concentrated sulfuric acid, a violet vat in alkaline hydrosulfite solution, and dyes cotton from this vat orange-yellow shades of excellent fastness against the action of chlorin and light.

In this invention, bromin is equivalent to chlorin.

The following example will serve to illustrate further the nature of our invention, which, however, is not confined to this example. The parts are by weight. Boil together, for about 3 hours, in a reflux apparatus from which air is excluded, 120 parts of 1-chlor-anthraquinone-2-carboxylic acid, 70 parts of 3.4-dichlor-thiophenol, 45 parts of caustic potash, and 1,000 parts of water. Then dilute with 1,000 parts of hot water, filter, and acidify the filtrate with dilute acetic acid. Filter off the dichlor-phenyl-thio-1-anthraquinone-2-carboxylic acid and wash and dry it. The acid thus obtained is orange-yellow and yields a reddish yellow solution in alkali and a violet solution in cold concentrated sulfuric acid, which latter solution, however, rapidly turns reddish brown. Heat 10 parts of the product thus obtained with 100 parts of concentrated sulfuric acid, on the water-bath, until a test portion, on being treated with excess of caustic soda, is pure yellow. Then pour the reaction mixture into water, filter off the coloring matter, wash it with water and extract it with boiling dilute sodium carbonate solution. It then consists of an orange-yellow powder which yields a violet vat and dyes cotton fast orange-yellow. The 3.4-dichlor-thiophenol employed in this example can be obtained by treating ortho-dichlorbenzene with chlorsulfonic acid and reducing the product with zinc dust.

Now what we claim is:—

1. The vat coloring matter which possesses a percentage composition corresponding to the formula where Hal means halogen—

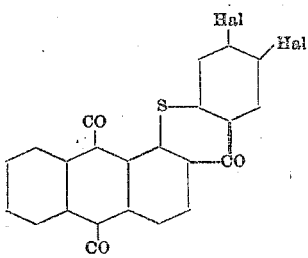

which coloring matter consists, when dry, of an orange-yellow powder, which yields a carmine red solution in concentrated sulfuric acid, a violet vat in alkaline hydrosulfite solution, and which dyes cotton from this vat orange-yellow shades of excellent fastness against the action of chlorin and light.

2. The vat coloring matter which possesses a percentage composition corresponding to the formula

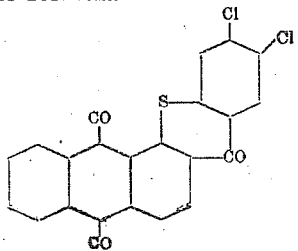

which coloring matter consists, when dry, of an orange-yellow powder, which yields a carmine red solution in concentrated sulfuric acid, a violet vat in alkaline hydrosulfite solution, and which dyes cotton from this vat orange-yellow shades of excellent fastness against the action of chlorin and light.

In testimony whereof we have hereunto set our hands in the presence of two subscribing witnesses.

ARTHUR LÜTTRINGHAUS.
HEINRICH von DIESBACH.

Witnesses:
J. ALEC. LLOYD,
JOSEPH PEIFFER.